United States Patent
Hsu (10) Patent No.: US 7,332,841 B2
(45) Date of Patent: Feb. 19, 2008

(54) COMPUTER COOLER WITH LIGHT EMITTING ARRANGEMENT

(76) Inventor: Sam Hsu, No. 13, Alley 86, Lane 412, Jennshin Rd., Taichung City (TW)

( * ) Notice: Subject to any disclaimer, the term of this patent is extended or adjusted under 35 U.S.C. 154(b) by 89 days.

(21) Appl. No.: 11/174,870

(22) Filed: Jul. 5, 2005

(65) Prior Publication Data
US 2007/0007831 A1   Jan. 11, 2007

(51) Int. Cl.
F21V 33/00   (2006.01)
F01D 25/00   (2006.01)

(52) U.S. Cl. .......................... 310/73; 362/253; 362/35; 310/67 R; 310/71; 310/73; 310/90; 310/261; 416/5; 415/216.1; 361/687; 361/695

(58) Field of Classification Search .................. 310/90; 362/227, 234, 253; 416/5, 6
See application file for complete search history.

(56) References Cited

U.S. PATENT DOCUMENTS

| | | | |
|---|---|---|---|
| 5,028,206 A * | 7/1991 | Kendregan et al. ............ 416/5 |
| 5,082,422 A * | 1/1992 | Wang ............................. 416/5 |
| 5,770,907 A * | 6/1998 | Danish et al. ................. 310/90 |
| 6,036,331 A * | 3/2000 | Acquisto ....................... 362/96 |
| 6,194,360 B1 * | 2/2001 | Karis et al. .................. 508/438 |
| 6,398,381 B1 * | 6/2002 | Tseng ........................... 362/96 |
| 6,790,003 B1 * | 9/2004 | Hu et al. ........................ 416/5 |
| 6,923,552 B2 * | 8/2005 | Tseng ........................ 362/192 |
| 7,037,073 B2 * | 5/2006 | Lin ................................. 416/5 |
| 7,055,977 B2 * | 6/2006 | Lai .............................. 362/96 |
| 7,121,697 B2 * | 10/2006 | Hsu ........................... 362/386 |

* cited by examiner

Primary Examiner—Darren Schuberg
Assistant Examiner—Naishadh N Desai
(74) Attorney, Agent, or Firm—Pro-Techtor Int'l Services (57) ABSTRACT

Provided is a cooler mounted in computer having a transparent case comprising a frame including a coil section including windings, a conductive first bearing on an upper center of the coil section, a conductive second bearing on a lower center of the coil section, and a rectification member electrically interconnected an AC power source and the coil section; a rotating assembly including blades, a conductive shaft passed the first and the second bearings, and a magnet spaced around the coil section, the magnet being magnetized by applying DC current from the rectification member to the coil section for rotating the rotating assembly; and a load placed on the rotating assembly and including LEDs and a conductive ring put on the shaft and biased against the first bearing. Applying AC to the rectification member will rotate the rotating assembly and cause LEDs to emit light.

8 Claims, 10 Drawing Sheets fig. 1 fig. 2 fig. 3 fig. 4 fig. 5 fig. 6 fig. 7 fig. 8 fig. 9 fig. 10

COMPUTER COOLER WITH LIGHT EMITTING ARRANGEMENT

BACKGROUND OF THE INVENTION

1. Field of Invention

The present invention relates to computer coolers and more particularly to such a computer cooler with a light emitting arrangement and other improved characteristics.

2. Related Art

Fans have been widely used as means for cooling operating components of computer. Also, transparent computer cases are commercially available. Thus, continuing exploitation of combined fan and transparent computer case is deserved to research.

SUMMARY OF THE INVENTION

It is therefore an object of the present invention to provide a cooler mountable in a computer having a transparent case, comprising a frame including a coil section including a plurality of windings spaced around a center thereof, a conductive first bearing provided on an upper center of the coil section, a conductive second bearing provided on a lower center of the coil section, and a rectification member provided inside the frame being electrically interconnected an AC power source and the coil section; a rotating assembly including a plurality of blades equally spaced around a center thereof, a conductive shaft passed the first and the second bearings, and a magnet spaced around the coil section, the magnet being magnetized by applying DC current from the rectification member to the coil section for rotating the rotating assembly; and a load placed on the rotating assembly and including an insulative layer provided on the shaft for insulating the shaft from the first bearing, a circuit board, a plurality of light emitting elements, and a conductive ring put on the shaft and biased against the first bearing, whereby applying AC to the rectification member will energize the coil section, rotate the rotating assembly, and activate the load for causing the light emitting elements to emit light.

In one aspect of the present invention, the first bearing comprises an outer fixing member and an inner rotating member.

In another aspect of the present invention, the first bearing is a lubricating bearing and the second bearing is a roller bearing.

In a further aspect of the present invention, the rotating assembly is elongate.

The above and other objects, features and advantages of the present invention will become apparent from the following detailed description taken with the accompanying drawings.

DETAILED DESCRIPTION OF THE INVENTION

Referring to FIGS. 1 to 5, a cooler in accordance with a first preferred embodiment of the invention is shown. The cooler is to be mounted in a computer and comprises a frame 10 and a rotating assembly 20. Each component is discussed in detailed below.

The frame 10 comprises a coil section 12, a conductive first bearing 13 (e.g., roller bearing) provided on an upper center of the coil section 12, a conductive second bearing 17 (e.g., lubricating bearing) provided on a lower center of the coil section 12, and a rectification member 16 on top of the frame 10, the rectification member 16 adapted to rectify AC current applied from a power source 11 for supplying generated DC to the coil section 12.

The rotating assembly 20 comprises a plurality of blades (not numbered) equally spaced around a center thereof, a conductive shaft 21 passed the first and second bearings 13 and 17, and an internal magnet 25 spaced around the coil section 12. The magnet 25 is magnetized by applying current to the coil section 12 for rotating the rotating assembly 20.

In one embodiment, a load 24 is placed on the rotating assembly 20. An insulative layer 22 is provided on the shaft 21 such that insulation is made possible between the shaft 21 and the first bearing 13. A first contact 161 and a second contact 162 are provided on the rectification member 16 and are electrically connected through the rectifier to the power source 11. The first contact 161 is electrically connected to the second bearing 17 through a third contact 163. The second bearing 17 is electrically interconnected to a first power source (e.g., positive voltage) and the shaft 21. A sixth contact 166 is electrically interconnected to the shaft 21 and the load 24. A second power source (e.g., negative voltage) is electrically connected to the first bearing 13 via the second contact 162 and a fourth contact 164. Next, power is fed to the load 24 via a fifth contact 165.

A first power cord 111 (e.g., positive) and a second power cord 112 (e.g., negative) are provided. The first and second power cords 111 and 112 are adapted to provide rectified DC to the coil section 12. The coil section 12 comprises two opposite first windings 121 and two opposite second windings 122 alternate with first windings 121. The spaced windings 121 and 122 are shaped as a circle and are electrically connected to the rectification member 16. A groove 14 is provided on the frame 10 with the power cord passed to connect to the frame 10. A plug 15 is adapted to prevent dust from entering and fix power cord connected to the second bearing 17. The first and second windings 121 and 122 are energized to generate induced voltage on the coil section 12 to magnetize the magnet 25 in response to receiving DC from the rectification member 16. As an end, the rotating assembly 20 rotates.

The first bearing 13 comprises an outer fixing member 131 and an inner rotating member 132. The second power cord 112 is electrically connected to the fourth contact 164 on the fixing member 131 via the second contact 162 of the rectification member 16. Thus, negative power is applied to the rotating member 132 via the fixing member 131.

The rotating assembly 20 is implemented as a fan and comprises the following components. The conductive shaft 21 is provided in a center of the rotating assembly 20. An insulative layer 22 is provided on the shaft 21 such that insulation is made possible between the shaft 21 and the rotating member 132. A conductive ring 23 is put on the shaft 21. A spring 231 is put on the ring 23 for urging the ring 23 against the rotating member 132. Thus, electricity can be supplied from the rotating member 132 to the ring 23 and the load 24 sequentially.

The load comprises a second circuit board 243 and at least two light emitting elements (e.g., LEDs) 241, and a number of electronic components 242.

Figure 1:
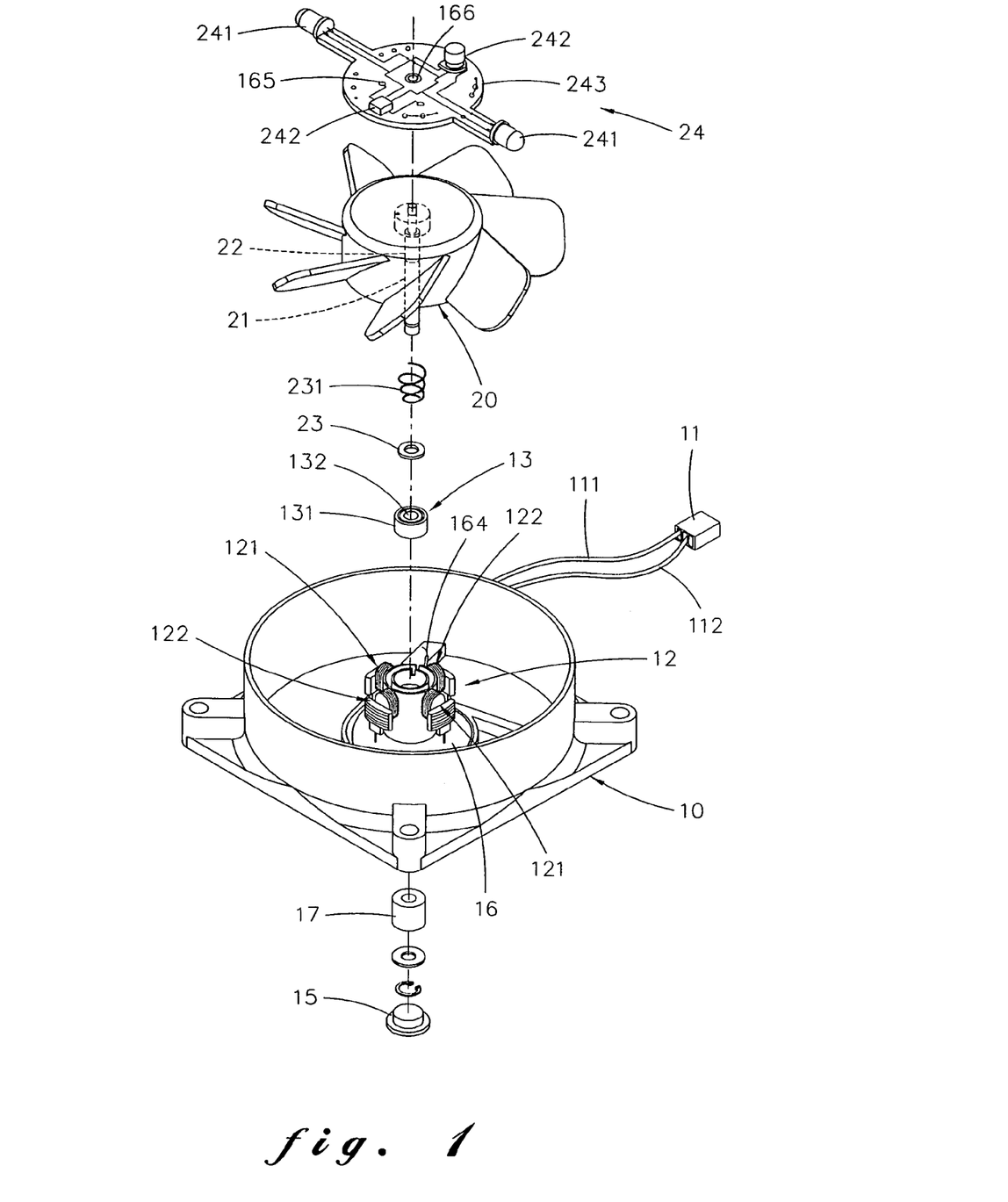
FIG. 1 is an exploded view of a first preferred embodiment of computer cooler according to the invention.
Figure 2:
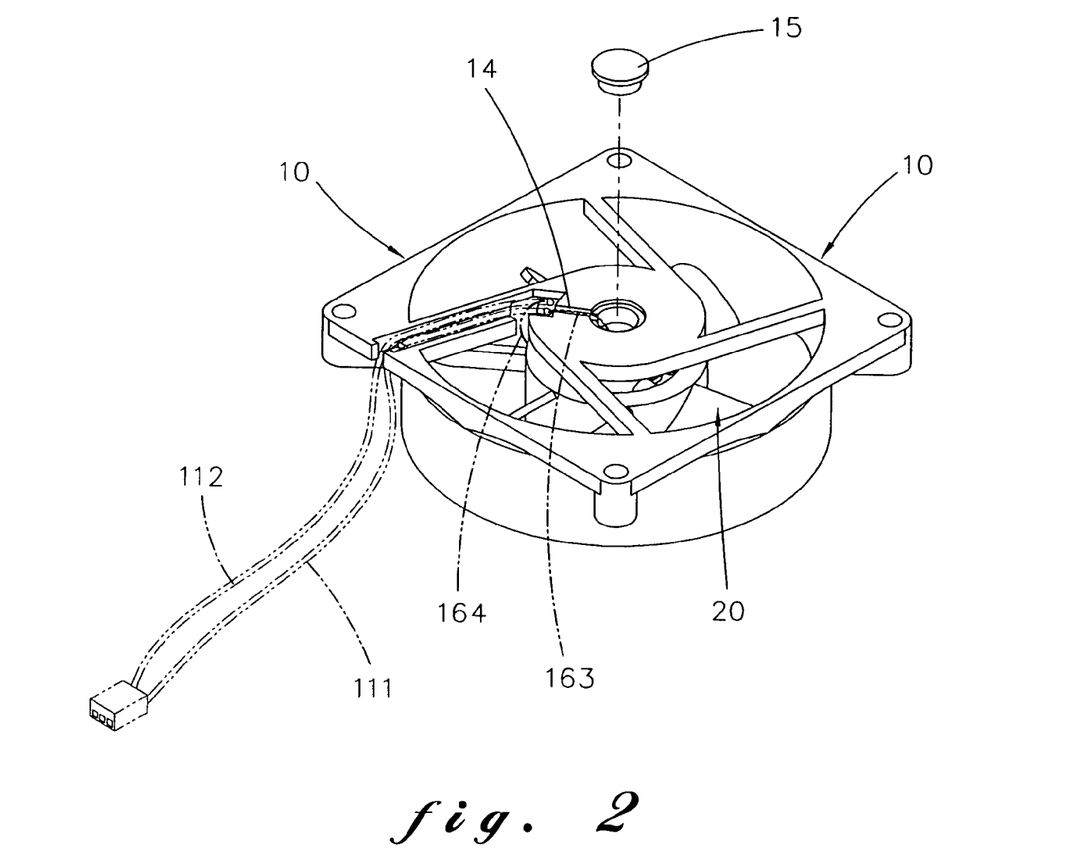
FIG. 2 is a perspective view of the assembled computer cooler in FIG. 1 viewed from one side.
Figure 3:
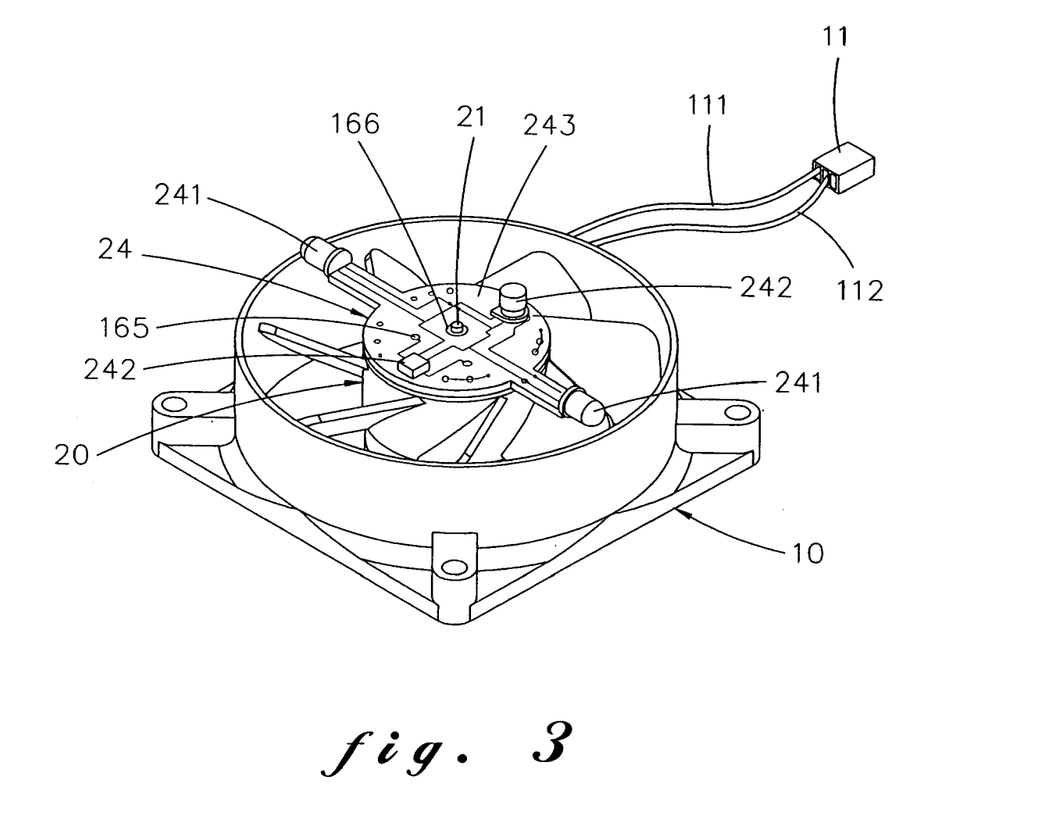
FIG. 3 is a view similar to FIG. 2 viewed from the other side.
Figure 4:
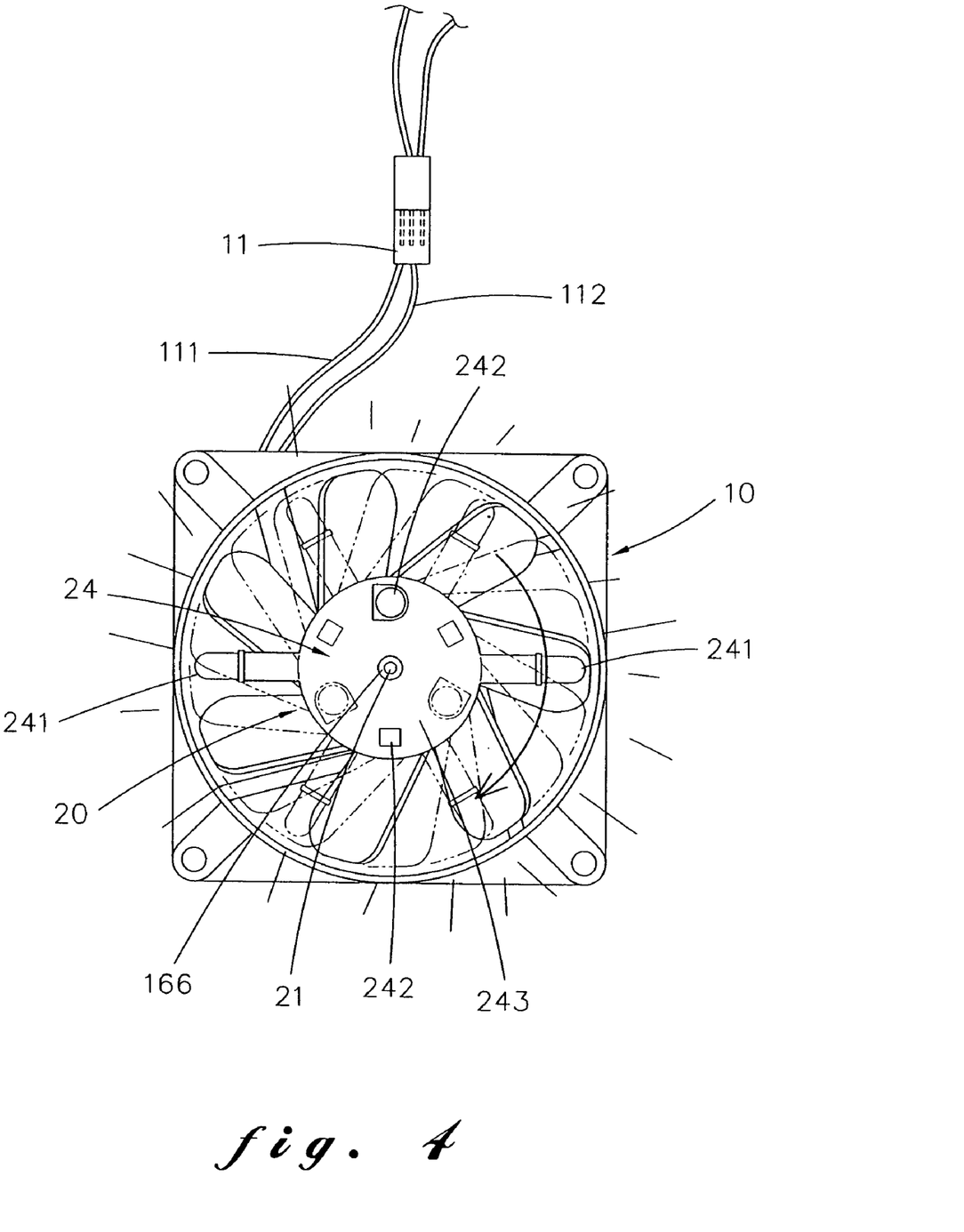
FIG. 4 is a plan view of the operating computer cooler.
Figure 5:
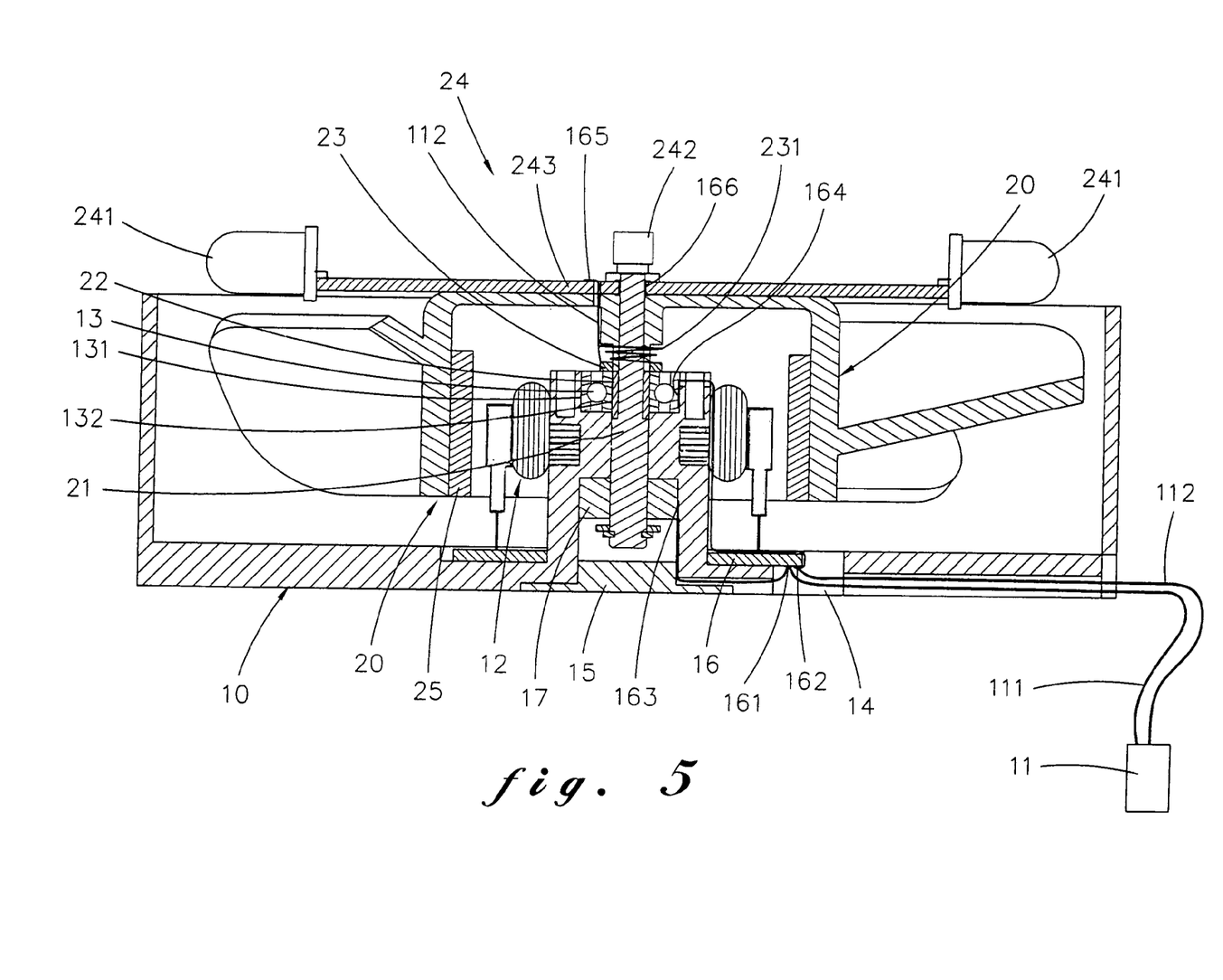
FIG. 5 is a sectional view of the computer cooler in FIG. 2.

Referring to FIGS. 4 and 5, the first power cord 111 is electrically connected to the shaft 21 and the load 24 (i.e., positive). The second power cord 112 is electrically connected to the power source via the negative contact of the rectifier to the fixing member 131. Thus, negative power is applied to the rotating member 132 via the fixing member 131 and roller. And in turn, negative power can be applied from the ring 23 to the load 24. Thus, a circuit is formed. The load 24 is energized when the rotating assembly 20 is rotating. The light emitting elements 241 are thus activated to emit light. In addition, it is possible of making sound if a buzzer is electrically connected to the load.

Figure 6:
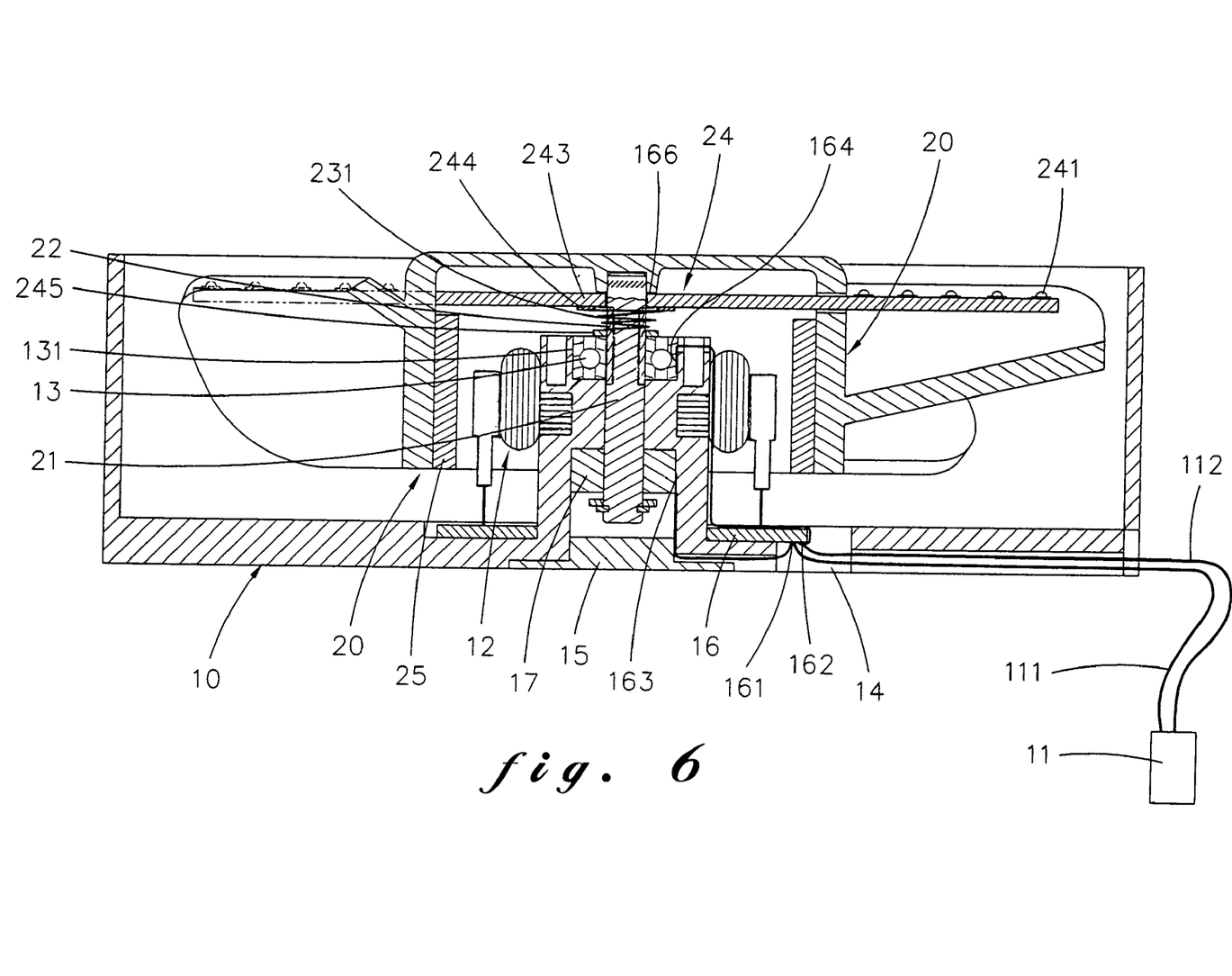
FIG. 6 is a view similar to FIG. 5 showing a second configuration of the rotating assembly.

Referring to FIG. 6, a second configuration embodiment of the rotating assembly 20 is shown. The load 24 is provided inside the rotating assembly 20. Also, a first metal ring 244 is provided and is electrically connected to the spring 231 which is in turn electrically connected to a second metal ring 245 on the rotating member 132. The light emitting element 241 is extended beyond the rotating assembly 20. Preferably, top of the rotating assembly 20 is transparent so as to permit light to pass.

Figure 7:
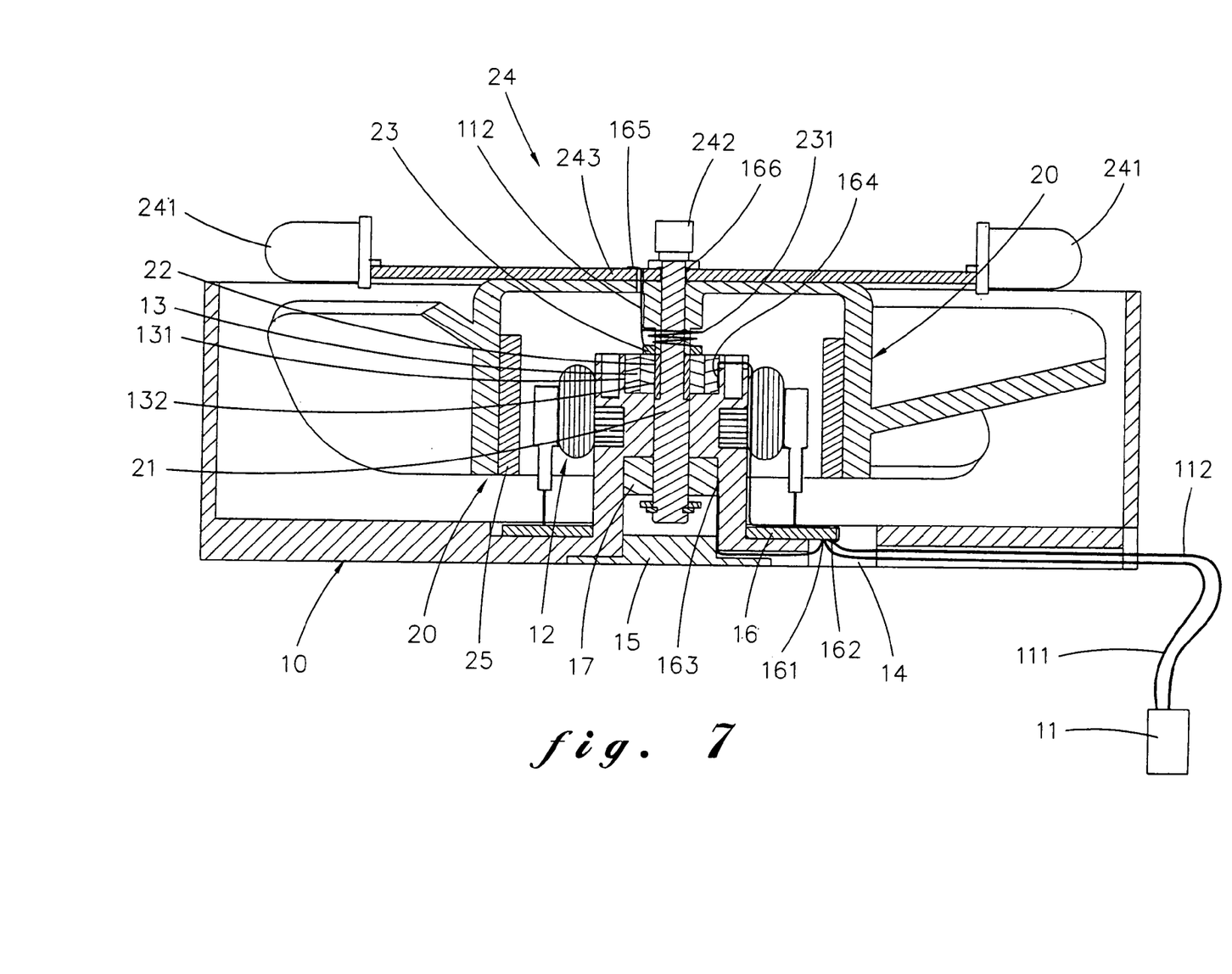
FIG. 7 is a view similar to FIG. 5 showing a second configuration of the second bearing.

Referring to FIG. 7, a second configuration embodiment of the first bearing 13 is shown. The first bearing 13 is conductive and is implemented as a lubricating bearing including an outer fixing member 131 and an inner rotating member 132 the same as above embodiment.

Figure 8:
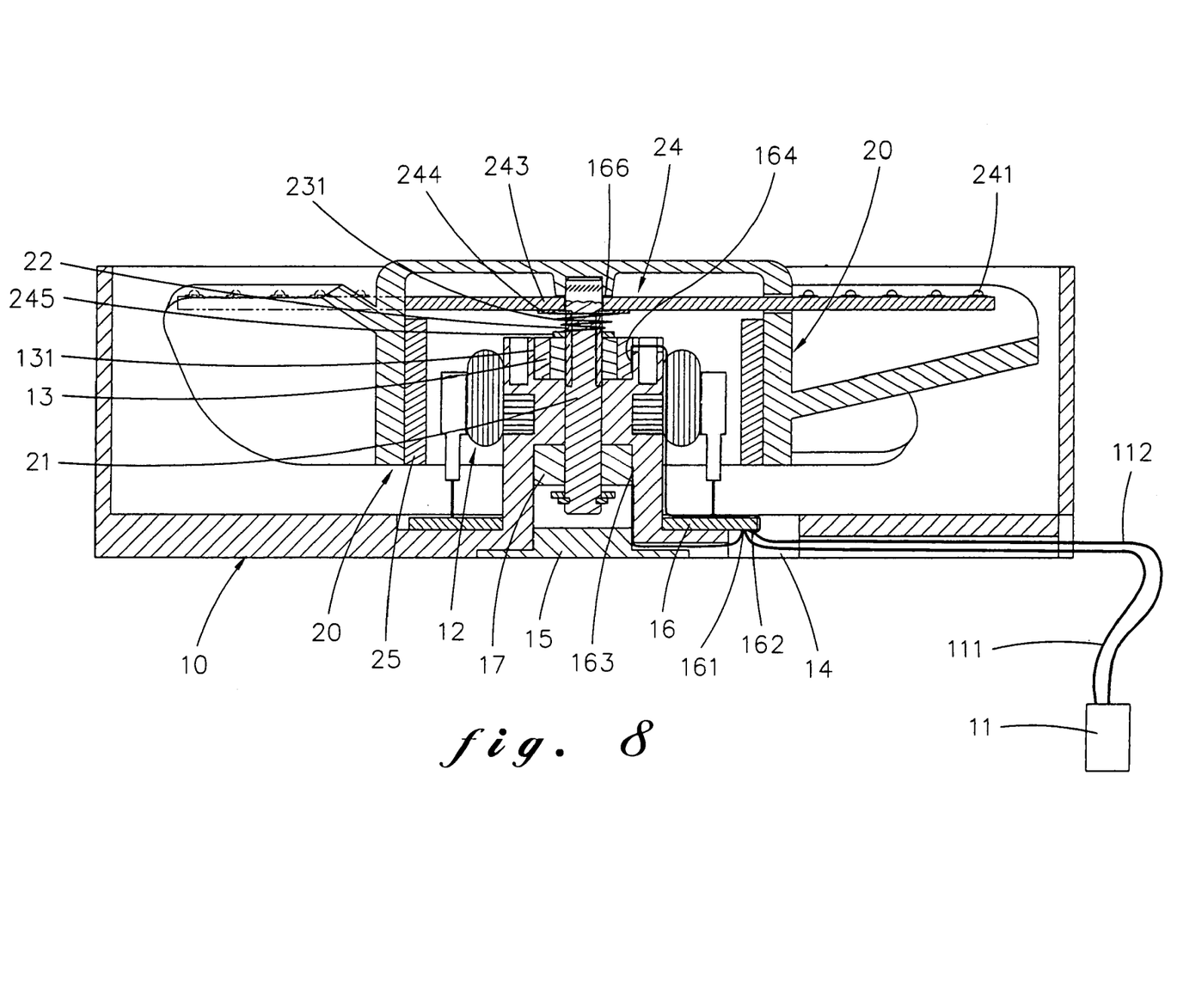
FIG. 8 is a view similar to FIG. 7 showing a third configuration of the first bearing.

Referring to FIG. 8, a third configuration embodiment of the first bearing 13 is shown. The load 24 is provided inside the rotating assembly 20.

Figure 9:
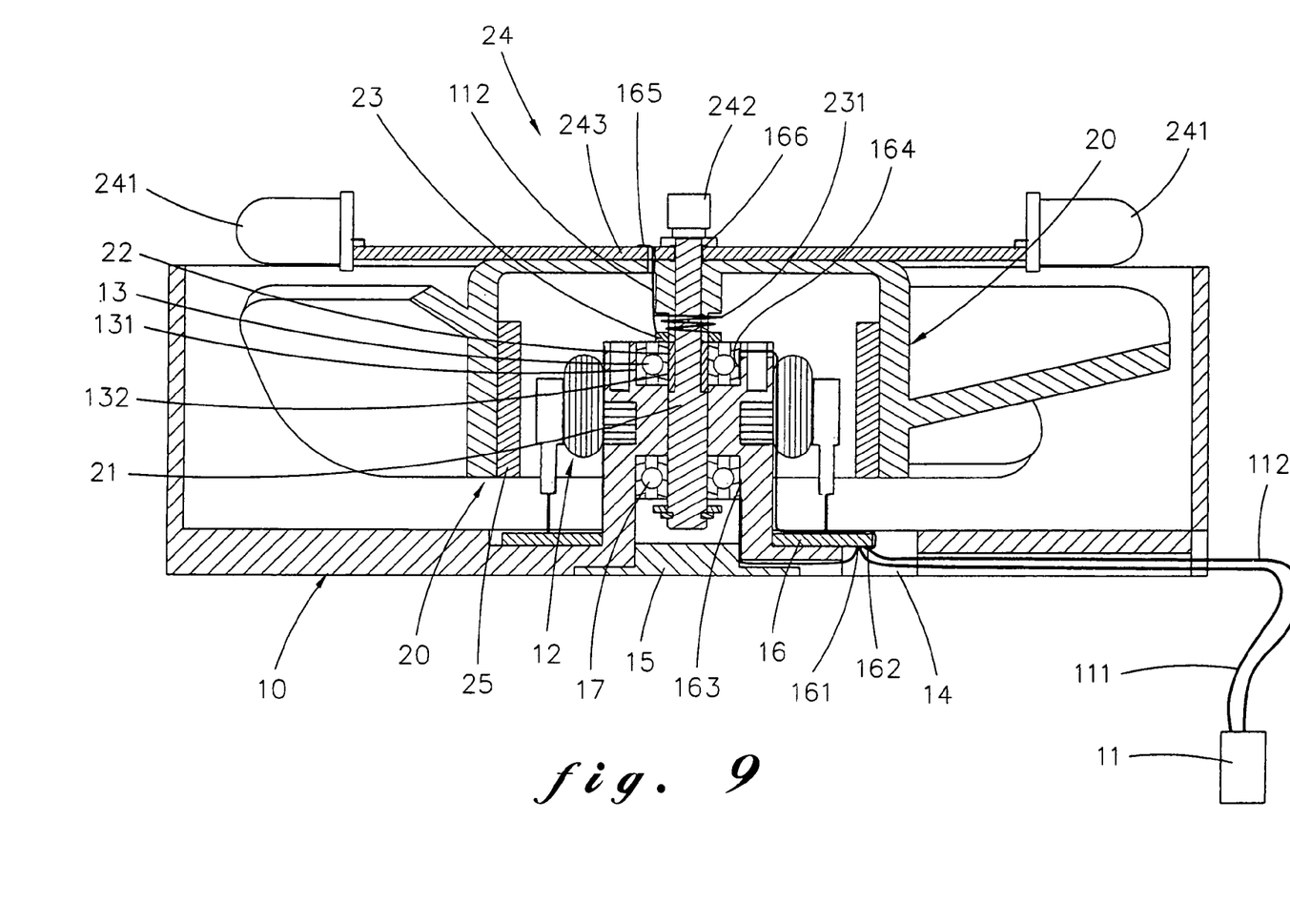
FIG. 9 is a view similar to FIG. 5 showing a second configuration of the second bearing.

Referring to FIG. 9, a second configuration embodiment of the second bearing 17 is shown. The second bearing 17 is implemented as a roller bearing.

Figure 10:
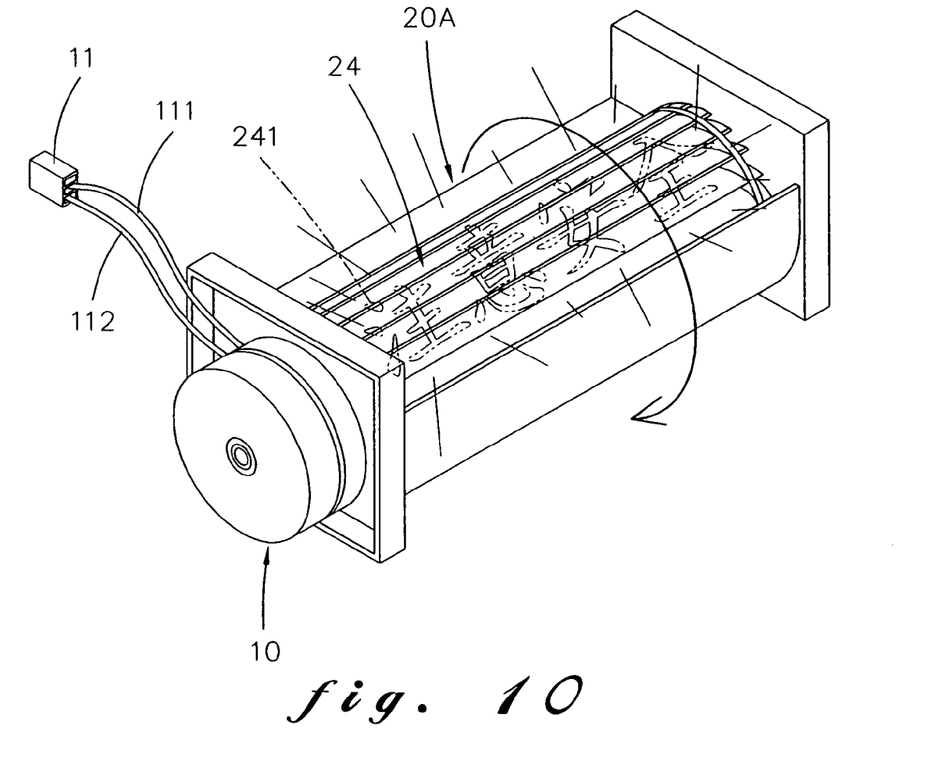
FIG. 10 is a sectional view of a second preferred embodiment of rotating assembly according to the invention.

Referring to FIG. 10, a second preferred embodiment of the rotating assembly 20 according to the invention is shown. The rotating assembly 20 is implemented as an elongate cylindrical cooler 20A with the light emitting elements 241 provided on the load 24 of the cooler 20A. Thus, a warning is lit when the rotating assembly 20 is activating.

While the invention herein disclosed has been described by means of specific embodiments, numerous modifications and variations could be made thereto by those skilled in the art without departing from the scope and spirit of the invention set forth in the claims.

What is claimed is:

1. A cooler mountable in a computer having a transparent case, comprising:
   a frame including a coil section having
      a plurality of windings spaced around an axis,
      a conductive first bearing disposed on an upper axial portion of the coil section,
      a conductive second bearing disposed on a lower axial portion of the coil section, and
      a rectification member attached to the frame, and being electrically interconnected to an AC power source and the coil section;
   a rotating assembly including
      a plurality of blades equally spaced around a hub coaxial with the coil section,
      a rotating conductive shaft attached to said hub and passed though the first and the second bearings with an insulative layer disposed on a portion of the shaft for insulating the shaft from at least one of said first bearing and said second bearing; and
      a magnet spaced around the coil section, the magnet reacting with the coil section to rotate the rotating assembly by applying DC current from the rectification member to the coil section; and
   a load placed on the rotating assembly and including
      a circuit board, and
      a plurality of light emitting elements;
   whereby applying AC to the rectification member will energize the coil section, rotate the rotating assembly, and activate the load causing the light emitting elements to emit light.

2. The cooler of claim 1, wherein the first bearing is a roller bearing and comprises an outer fixing member and an inner rotating member.

3. The cooler of claim 2, wherein the first second bearing is a lubricating bearing.

4. The cooler of claim 1, wherein the load is electrically connected to a DC output terminal of the rectification member through the conductive shaft.

5. The cooler of claim 4, wherein the load is elongate.

6. The cooler of claim 4, wherein each of the light emitting elements is an LED.

7. The cooler of claim 1, wherein the rotating assembly has a substantially transparent top.

8. A cooler mountable in a computer having a transparent case, comprising:
   a frame including a coil section having
      a plurality of windings spaced around an axis near a center thereof,
      a conductive first bearing, having a rotating member and a fixing member, disposed on an upper center portion of the coil section,
      a conductive second bearing disposed on a lower center portion of the coil section, and
      a rectification member disposed inside the frame being electrically interconnected to an AC power source and the coil section, and having a first DC contact and a second DC contact;
   a rotating assembly including
      a plurality of blades equally spaced around a center hub,
      a rotating conductive shaft attached to said hub and passed though the first and the second bearings,
      an insulative layer disposed on an upper portion of the shaft for insulating the shaft from the first bearing,
      a substantially transparent top; and
      a magnet spaced around the coil section, the magnet reacting with the coil section to rotate the rotating assembly by applying DC current from the rectification member to the coil section; and a load placed on the rotating assembly and including
a circuit board,
a plurality of light emitting elements, and
a conductive ring put on the shaft and biased against the first bearing,
a first load terminal being electrically connected to the first DC contact of the rectification member through the conductive ring to the rotating member of the first conductive bearing, and a second load terminal being electrically connected to the second DC contact of the rectification member through the conductive shaft and the second conductive bearing;

whereby applying AC to the rectification member will energize the coil section, rotate the rotating assembly, and activate the load causing the light emitting elements to emit light.

* * * * *